(12) United States Patent
Lee et al.

(10) Patent No.: US 9,261,742 B2
(45) Date of Patent: Feb. 16, 2016

(54) DISPLAY SUBSTRATE, MOTHER SUBSTRATE FOR MANUFACTURING THE SAME AND METHOD OF MANUFACTURING THE DISPLAY SUBSTRATE

(75) Inventors: Chong-Guk Lee, Seoul (KR);
Sung-Dong Park, Asan-si (KR);
Seok-Hyun Jung, Asan-si (KR);
Bon-Yong Koo, Cheonan-si (KR);
Joo-Yeon Won, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 428 days.

(21) Appl. No.: 13/524,516

(22) Filed: Jun. 15, 2012

(65) Prior Publication Data
US 2013/0170151 A1    Jul. 4, 2013

(30) Foreign Application Priority Data
Jan. 3, 2012  (KR) ........................ 10-2012-0000355

(51) Int. Cl.
*G01R 31/26*    (2014.01)
*G02F 1/1345*   (2006.01)
*G09G 3/00*     (2006.01)

(52) U.S. Cl.
CPC ........ *G02F 1/13452* (2013.01); *G02F 1/13454* (2013.01); *G09G 3/006* (2013.01); *G09G 2300/0408* (2013.01); *G09G 2330/12* (2013.01); *Y10T 29/49002* (2015.01)

(58) Field of Classification Search
CPC .................. G02F 2001/136254; G02F 1/1345; G02F 1/13452; G02F 1/13458; G02F 1/136286; G02F 2203/69; G02F 1/13454; G09G 3/006; G09G 2300/0426; G09G 2300/0408; G09G 2330/12; G01R 31/2601; H05K 7/00; Y10T 29/49002
USPC .......................... 324/761.01, 760.01–760.02, 324/762.01–762.03; 349/139, 151, 187, 33, 349/143, 149, 40, 54; 345/87, 214, 3, 5, 345/98–100
See application file for complete search history.

(56) References Cited

U.S. PATENT DOCUMENTS 5,748,267 A * 5/1998 Natori et al. .................... 349/40
6,310,667 B1 * 10/2001 Nakayoshi ............ G02F 1/1345
257/72

(Continued)

FOREIGN PATENT DOCUMENTS

| | | |
|---|---|---|
| JP | 11-084420 | 3/1999 |
| JP | 2007-079541 | 3/2007 |
| KR | 10-2005-0002141 | 1/2005 |

*Primary Examiner* — Arleen M Vazquez
*Assistant Examiner* — Lee Rodak
(74) *Attorney, Agent, or Firm* — H.C. Park & Associates, PLC

(57) ABSTRACT

A display substrate includes a circuit mounted part that has a driving IC mounted thereon. The circuit mounted part includes an input pad part connected to an input terminal of the driving IC and an output pad part connected to an output terminal of the driving IC. A flexible pad part connected to a terminal of a FPCB includes a driving pad part to receive a drive signal of the driving IC. A driving line part is connected to the driving pad part to be extended along a length direction of the circuit mounted part within the circuit mounted part. Connection lines are extended from the driving line part disposed within the circuit mounted part toward the output pad part. The connection lines are partially removed in a trimming area defined between the driving line and the output pad part.

21 Claims, 10 Drawing Sheets

(56) References Cited

U.S. PATENT DOCUMENTS

| | | | |
|---|---|---|---|
| 7,528,897 B2 * | 5/2009 | Yang et al. | 349/55 |
| 7,649,585 B2 * | 1/2010 | Jeoung et al. | 349/54 |
| 7,663,395 B2 * | 2/2010 | Chang | G02F 1/13454 324/760.01 |
| 7,777,854 B2 | 8/2010 | Moon | |
| 2006/0033852 A1 * | 2/2006 | Kim | 349/38 |
| 2009/0296011 A1 * | 12/2009 | Yoon et al. | 349/40 |
| 2010/0301891 A1 * | 12/2010 | Moon | 324/760.01 |

* cited by examiner

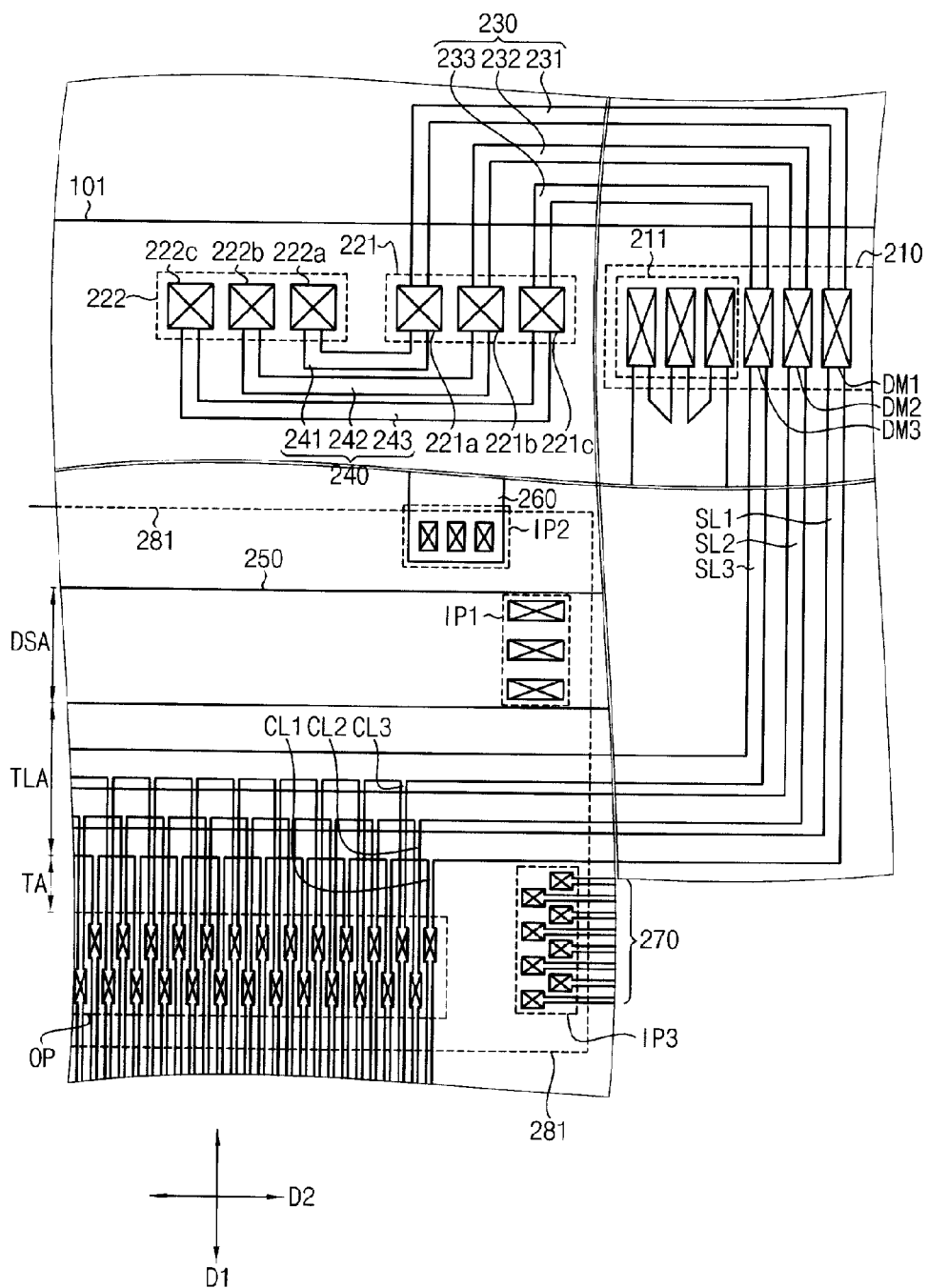

DISPLAY SUBSTRATE, MOTHER SUBSTRATE FOR MANUFACTURING THE SAME AND METHOD OF MANUFACTURING THE DISPLAY SUBSTRATE

CROSS-REFERENCE TO RELATED APPLICATION

This application claims priority from and the benefit of Korean Patent Application No. 10-2012-0000355, filed on Jan. 3, 2012, which is hereby incorporated by reference for all purposes as if fully set forth herein.

BACKGROUND OF THE INVENTION

1. Field of the Invention

Example embodiments of the present invention relate to a display substrate, a mother substrate for manufacturing the display substrate and a method of manufacturing the display substrate. More particularly, exemplary embodiments of the present invention relate to a display substrate capable of reducing manufacturing cost, a mother substrate for manufacturing the display substrate and a method of manufacturing the display substrate.

2. Description of the Related Art

Generally, a liquid crystal display ("LCD") panel may include an array substrate, an upper substrate facing the array substrate and a liquid crystal layer interposed between the array substrate and the upper substrate. The array substrate includes a pixel area for displaying an image and a peripheral area surrounding the pixel area.

Typically, a plurality of gate lines, a plurality of data lines and a plurality of pixel electrodes may be formed on the pixel area. A plurality of pads, on which a driving chip for outputting a drive signal is mounted, are formed on the peripheral area.

When the array substrate is manufactured, an array inspection process for inspecting an electrical operation for a line formed on the array substrate and a visual inspection ("V/I") process for inspecting an electrical and optical operation of a display panel are performed.

In order to perform the array inspection process and the V/I process, a plurality of inspection lines and a plurality of inspection pads may be formed on the peripheral area. The inspection lines and the inspection pads are combined with gate lines and data lines, and then inspection signals are respectively applied to the gate lines and the data lines through the inspection lines and the inspection pads to inspect defects of the gate lines and the data lines.

Therefore, there is a need for an approach to perform the array inspection process and the V/I process without providing inspection lines.

SUMMARY OF THE INVENTION

These and other needs are addressed by the present invention, in which exemplary embodiments provide a mother substrate for a display panel capable of reducing manufacturing cost while capable of perform the array inspection process and the V/I process without inspection lines.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a display substrate. The substrate includes a circuit mounted part including an input pad part coupled to an input terminal of a driving integrated circuit (IC) of the circuit mounted part and an output pad part coupled to an output terminal of the driving IC. The substrate also includes a flexible pad part coupled to a terminal of a flexible printed circuit board, the flexible pad part including a driving pad part to receive a drive signal of the driving IC. The substrate includes a driving line part coupled to the driving pad part to be extended along a length direction of the circuit mounted part. The substrate includes a plurality of connection lines extended from the driving line part disposed within the circuit mounted part toward the output pad part, the connection lines are partially removed in a trimming area and the trimming are is defined between the driving line and the output pad part.

Exemplary embodiments of the present invention disclose a mother substrate. The mother substrate includes a cutting line and a display cell defined by the cutting line. The display cell includes a circuit mounted part including a driving integrated circuit ("IC") and an input pad part coupled to an input terminal of the driving IC and an output pad part coupled to an output terminal of the driving IC. The mother substrate also includes a flexible pad part coupled to a terminal of a flexible printed circuit board, the flexible pad part including a driving pad part to receive a drive signal of the driving IC. The mother substrate includes a driving line part connected to the driving pad part to be extended along a length direction of the circuit mounted part. And a plurality of connection lines extended from the driving line part disposed within the circuit mounted part toward the output pad part, the connection lines are partially removed in a trimming area and the trimming area is defined between the driving line and the output pad part.

Exemplary embodiments of the present invention disclose a method. The method includes disposing a display cell being defined by a cutting line. The method also includes mounting a circuit mounted part comprising a driving integrated circuit ("IC") and an input pad part coupled to an input terminal of the driving IC and an output pad part coupled to an output terminal of the driving IC. The method includes disposing a flexible pad part coupled to a terminal of a flexible printed circuit board, the flexible pad part comprising a driving pad part to receive a drive signal of the driving IC. The method includes disposing a driving line part coupled to the driving pad part to be extended along a length direction of the circuit mounted part, wherein a plurality of connection lines are extended from the driving line part disposed within the circuit mounted part toward the output pad part, the connection lines partially being removed in a trimming area which is defined between the driving line and the output pad part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 5 is a plan view of an exemplary a mother substrate to compare with exemplary embodiments of the present invention.

DETAILED DESCRIPTION OF THE ILLUSTRATED EMBODIMENTS

A substrate and a mother substrate of a display are disclosed. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
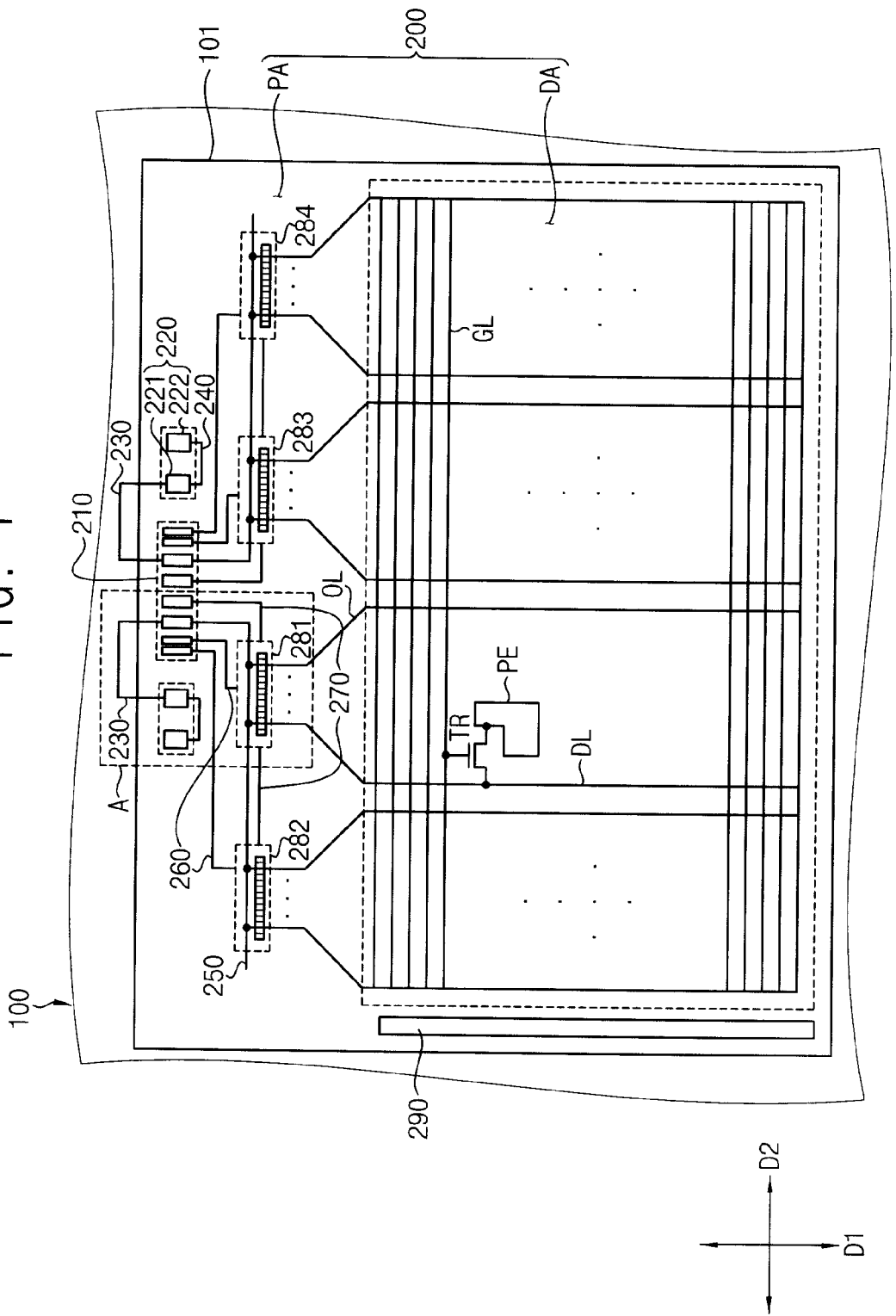
FIG. 1 is a plan view schematically illustrating a mother substrate including a display cell according to exemplary embodiments of the present invention.

FIG. 1 is a plan view schematically illustrating a mother substrate including a display cell according to exemplary embodiments of the present invention.

Referring to FIG. 1, the mother substrate 100 includes a cutting line 101 which defines a plurality of display cells 200. The display cell 200 includes a display area DA and a peripheral area PA surrounding the display area DA.

The display area DA includes a plurality of data lines DL, a plurality of gate lines GL, a plurality of switching elements TR and a plurality of pixel electrodes PE. Each of the data lines DL is extended along a first direction D1 to be arranged in a second direction D2 crossing the first direction D1. Each of the gate lines GL is extended along the second direction D2 to be arranged in the first direction D1. Each of the switching elements TR is electrically connected to the gate line GL and the data line DL. Each of the pixel electrodes PE is electrically connected to the switching element TR.

A flexible pad part 210, an inspection pad part 220, a first inspection line part 230, a second inspection line part 240, a first driving line part 250, a second driving line part 260, a third driving line part 270 and a plurality of circuit mounted parts 281, 282, 283 and 284 are formed on the peripheral area PA. Moreover, a gate driving circuit 290 is further formed on the peripheral area PA, which is connected to the gate lines to sequentially provide a gate signal with the gate lines.

The flexible pad part 210 may include a plurality of driving pads electrically connected to terminals of flexible printed circuit boards ("FPCBs"). The driving pads receive drive signals for driving a display substrate corresponding to the display cell 200. For example, the driving pads receive data drive signals for driving a driving integrated circuit ("IC") mounted on each of the circuit mounted parts 281, 282, 283 and 284, and gate drive signals for driving the gate driving circuit 290. The data drive signal, for example, may include analog power signals AVDD and AVSS, logic power signals DVDD and DVSS, a data signal, a clock signal, a gamma signal, and a carry signal. The gate drive signal, for example, may include a gate clock signal and a gate power signal VOFF.

The inspection pad part includes an array pad part 221 for receiving an electric operation state for data lines of the display area DA and an V/I pad part 222 for receiving an V/I signal in a visual inspection process ("V/I process") for inspecting an electric operation state and an optic operation state of a display panel after a liquid crystal process.

The first inspection line part 230 connects to the flexible pad part 210 and the array pad part 221. The first inspection line part 230 is formed on the display cell 200 and the mother substrate 100 via the cutting line 101. For example, the first inspection line part 230 is connected to a first terminal of the flexible pad part 210 to be extended toward an external portion of the cutting line 101, and is extended toward an internal portion of the cutting line 101 to be connected to a second terminal of the array pad part 221. During the array inspection process, an array inspection signal applied to the array pad part 221 is delivered to the flexible pad part 210 through the first inspection line part 230. The first inspection line part 230 does not connect the flexible pad part 210 and the array pad part 221 after a cutting process is performed.

The second inspection line part 240 connects to the array pad part 221 and the V/I pad part 222. During the V/I process is performed, an V/I signal applied to the V/I pad part 222 is applied to the flexible pad part 210 via the second inspection line part 240, the array pad part 221 and the first inspection line part 230.

In the array inspection process and the V/I process, the flexible pad part 210 is used as a path delivering the array inspection signal and the V/I signal. After a bonding process, the flexible pad part 210 is used as a pad receiving a drive signal of the driving IC and the gate driving circuit 290 that are disposed on the display cell 200.

The first driving line part 250 is connected to the flexible pad part 210 to be extended along a second direction D2 via plural circuit mounted parts. For example, the first driving line part 250 may have a symmetric structure in a left and right direction with respect to the flexible pad part 210. The first driving line part 250 may be disposed via a first circuit mounted part 281 and a second circuit mounted part 282 in a left side, and may be disposed via a third circuit mounted part 283 and a fourth circuit mounted part 284.

The first driving line part 250 is connected to a panout line OL disposed on the peripheral area PA through a connection line. The panout line OL is connected to the data line DL of the display area DA.

Thus, the first driving line part 250 may deliver an inspection signal to the data line when the array inspection process and the V/I process are performed. After a cutting process and a bonding process are performed, the first driving line part 250 may deliver a first drive signal to the first driving IC, the second driving IC, the third driving IC and the fourth driving IC mounted on the first mounted part 281, the second mounted part 282, the third mounted part 283 and the fourth mounted part 283, respectively, in a multiple manner or in a one-to-plural correspondence. The first drive signal may include a first power signal such as VDD1 and VSS2. The first power signal may be a logic power signal DVDD and DVSS. The cutting process may include a process that the display cell 200 is removed from the mother substrate 100 along the cutting line 101 and a process which trims a connection line connecting the first driving line part 250 and the panout line OL using a laser.

The second driving line part 260 is connected to the flexible pad part 210 to be extended toward the first mounted part 281, the second mounted part 282, the third mounted part 283 and the fourth circuit mounted parts 284, respectively. The second driving line part 260 may have a symmetric structure in a left and right direction with respect to the flexible pad part 210. The second driving line part 260 delivers a second drive signal to each of the first to fourth circuit mounted parts 281, 282, 283 and 284 in a point-to-point ("PTP") manner or a one-to-one manner. The second drive signal, for example, may include second power signals VDD2 and VSS2, a data signal, and a clock signal. The second power signals VDD2 and VSS2 may be analog power signals AVDD and AVSS.

The third driving line part 270 is disposed between the flexible pad part 210 and a circuit mounted part, and is also disposed between circuit mounted parts adjacent to each other. The third driving line part 270 may have a symmetric structure in a left and right direction with respect to the flexible pad part 210. According to the exemplary embodiments of the present invention, the third driving line part 270 may be disposed between the flexible pad part 210 and the first circuit mounted part 281. For another example, the third driving line part 270 may be disposed between the first circuit mounted part 281 and a second circuit mounted part 282. For still another example, the third driving line part 270 may be disposed between the flexible pad part 210 and a third circuit mounted part 283. For another example, the third driving line part 270 may be disposed between the third circuit mounted part 283 and a fourth circuit mounted part 284. The third driving line part 270 delivers a third drive signal to the first to fourth circuit mounted parts 281, 282, 283 and 284 in a cascade manner. The third drive signal, for example, may include the gamma signal and the carry signal.

The circuit mounted parts 281, 282, 283 and 284 are areas on which the first driving IC, the second driving IC, the third driving IC and the fourth driving IC are mounted. Each of the circuit mounted parts 281, 282, 283 and 284 includes input and output pads. The input and output pads are connected to input terminal and output terminal of the driving IC through a conductive adhesive member. The input and output pads includes an input pad connected to an input terminal of the driving IC to output the drive signal for driving the driving IC and an output pad connected to an output terminal of the driving IC to receive an output signal of the driving IC.

According to the exemplary embodiments of the present invention, the first driving line part 250 is arranged in a second direction within the circuit mounted parts 281, 282, 283, and 284. The output pad is connected to the panout line OL, and is connected to the first driving line part 250 through the connection line. Thus, the first driving line part 250 and the output pad are connected through the connection line. When the array inspection process and the V/I process are performed, an inspection signal may be provided to the data line through the panout line OL.

The connection line is removed after the cutting process and the bonding process are performed, so that the first driving line part 250 and the data line DL may be electrically opened. Thus, the first driving line part 250 may deliver the first drive signal received from the flexible pad part 210 to the first to fourth driving ICs mounted on the first circuit mounted parts 281, 282, 283 and 284 in a multiple manner.

Figure 2:
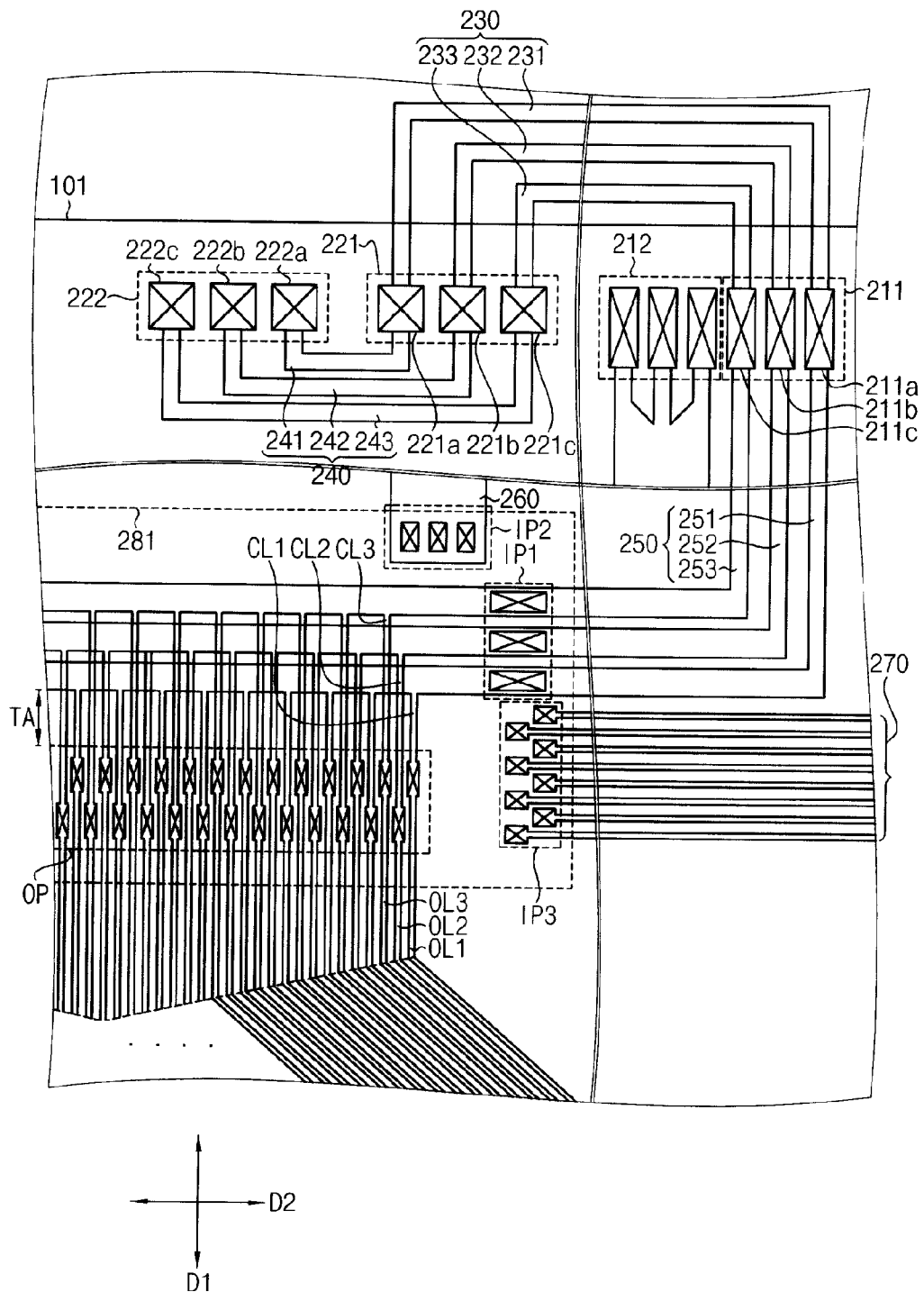
FIG. 2 is an enlarged view of "A" portion of FIG. 1.
Figure 3:
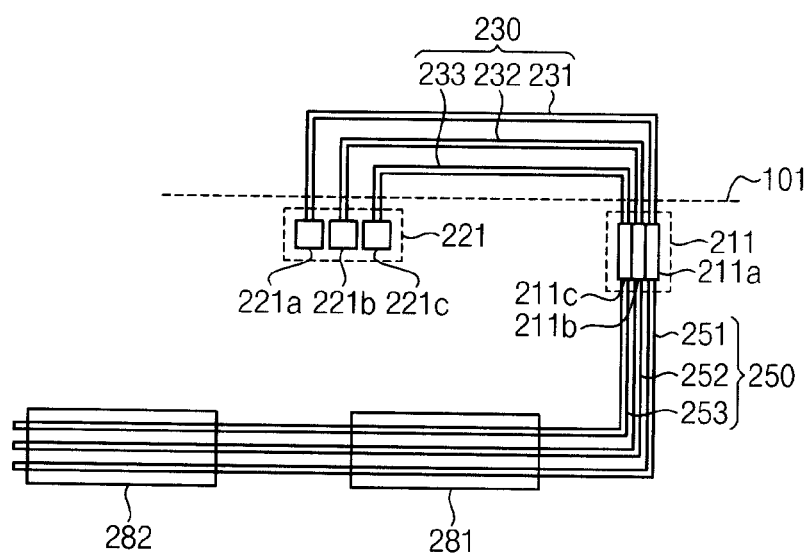
FIG. 3 is a diagram schematically illustrating a first driving line part of FIG. 2.

FIG. 2 is an enlarged view of "A" portion of FIG. 1. FIG. 3 is a concept diagram schematically illustrating a first driving line part of FIG. 2.

Hereinafter, a first driving line part disposed at a left portion of the first driving line part 250 having a symmetric structure in a left and right direction will be described, and detailed descriptions of a second driving line part disposed at a right portion of the first driving line part 250 will be omitted to avoid unnecessarily obscuring the present invention.

Referring to FIGS. 1, 2 and 3, the flexible pad part 210 includes a first driving pad part 211 connected to the first driving line part 250 to receive the first drive signal, a second driving pad part 212 connected to the second driving line part 260 to receive the second drive signal, and a third driving pad part (not shown) connected to the third driving line part 270 to receive the third drive signal.

The first drive signal is a signal transmitted to the first to fourth circuit mounted parts 281, 282, 283 and 284 in the multiple manner, and the second drive signal is a signal transmitted to the first to fourth circuit mounted parts 281, 282, 283 and 284 in the PTP manner. The third drive signal is a signal transmitted to the first to fourth circuit mounted parts 281, 282, 283 and 284 in a cascade manner.

For example, the array inspection part 221 includes a first array pad 221a, a second array pad 221b and a third array pad 221c. The V/I part 222 includes a first V/I pad 222a, a second V/I pad 222b and a third V/I pad 222c. The first driving pad part 211 includes a first pad 211a, a second pad 211b and a third pad 211c.

The first inspection line part 230 includes a first inspection line 231, a second inspection line 232 and a third inspection line 233. The first inspection line 231, the second inspection line 232 and the third inspection line 233 connect to the first array pad 221a, the second array pad 221b and third array pad 221c and the first pad 211a, the second pad 211b and the third pad 211c through the cutting line 101, respectively.

The second inspection line part 240 includes a fourth inspection line 241, a fifth inspection line 242 and a sixth inspection line 243. The fourth inspection line 241, the fifth inspection line 242 and the sixth inspection line 243 connect to the first V/I pad 222a, the second pad 222b and the third V/I pads 222c and the first array pad 221a, the second array pad 221b and the third array pad 221c, respectively.

The first driving pad part 211 is connected to the first driving line part 250. The first driving pad part 211 receives an inspection signal when an array process and a V/I process are performed, and receives the first drive signal after a cutting process and a bonding process are performed.

The first driving line part 250 includes a first line 251, a second line 252 and a third line 253 in correspondence with the first driving pad part 211, and the first line 251, the second line 252, and the third line 253 are extended along a second direction D2 to be penetrated through interiors of the first circuit mounted part 281 and the second circuit mounted part 282. The first line 251, the second line 252, and the third line 253 are arranged in parallel with each other. The first line 251 is connected to the first pad 211a, the second line 252 is connected to the second pad 211b, and the third line 253 is connected to the third pad 211c.

The first circuit mounted part 281 is an area on which a first driving IC is mounted. The first circuit mounted part 281 includes a first input pad part IP1, a second input pad part IP2, a third input pad part IP3 and an output pad part OP. The first input pad part IP1, the second input pad part IP2 and the third input pad part IP3 are respectively connected to input terminals of the first driving IC. The output pad part OP is respectively connected to output terminals of the first driving IC.

The first input pad part IP1 is connected to the first driving line part 250 to receive the first drive signal, and the second input pad part IP2 is connected to the second driving line part 260 to receive the second drive signal. The third input pad part IP3 is connected to the third driving line part 270 to receive the third drive signal.

The first input pad part IP1 may include at least one input pad disposed on the first line 251, the second line 252 and the third line 253 of the first driving line part 250. The second input pad part IP2 is connected to the second driving line part 260. The second input pad part IP2 may include at least one input pad disposed on the second driving line part 260.

The second input pad part IP may be disposed in adjacent to an upper long side of the first circuit mounted part 281. The third input pad part IP3 is connected to the third driving line part 270. The third input pad part IP3 may include at least one input pad disposed on the third driving line part 270. The third input pad part IP3 may be disposed in adjacent to left and right short sides of the first circuit mounted part 281 in a cascade manner.

The output pad part OP includes a plurality of output pads connected to plural panout lines OL1, OL2 and OL3. The output pads are connected to the first line 251, the second line 252 and the third line 253 extended along the second direction D2 through the CL1, CL2 and CL3 extended along the first direction D1. For example, when a first data line, a second data line and a third data line are connected to a red pixel, a green pixel and a blue pixel, respectively, a first panout line OL1 connected to the first data line is the first line 251 through the first connection line CL1, a second panout line OL2 connected to the second data line is the second line 252 through the second connection line CL2, and a third panout line OL3 connected to the third data line is the third line 253 through the third connection line CL3.

During the array inspection process and the V/I process are performed, a first inspection signal delivered through the first line 251 may be applied to the red pixel, a second inspection signal delivered through the second line 252 may be applied to the green pixel, and a third inspection signal delivered through the third line 253 may be applied to the red pixel.

Moreover, the first circuit mounted part 281 includes a trimming area TA defined between the output pad part OP and the third driving line part 270. The trimming area TA is an area where the connection lines CL1, CL2 and CL3 are removed through a laser when the cutting process is performed. The output pad part OP and the first driving line part 250 may be electrically opened to each other after the cutting process is performed.

According to the exemplary embodiments of the present invention, three inspection signals are used in the inspection process. However, the number of inspection signals is not limited to a certain number. The first driving line part 250 used as the inspection line may include plural lines in accordance with the number of inspection signals, and the first driving pad part 210 may also include plural pads in accordance with the number of inspection signals.

According to the present exemplary embodiments, an array inspection process and a V/I process may be performed by using the first driving line part 250 and the first driving pad part 211. Thus, an additional inspection line may not be necessary from a circuit mounted part, so that a size of the circuit mounted part may be decreased. Consequently a size of a driving IC mounted on the circuit mounted part may be decreased. Moreover, an additional inspection pad may not be necessary from a flexible pad part, thus a size of a FPCB may be decreased. As a result, a manufacturing cost of a display substrate can be reduced.

Figure 4A:
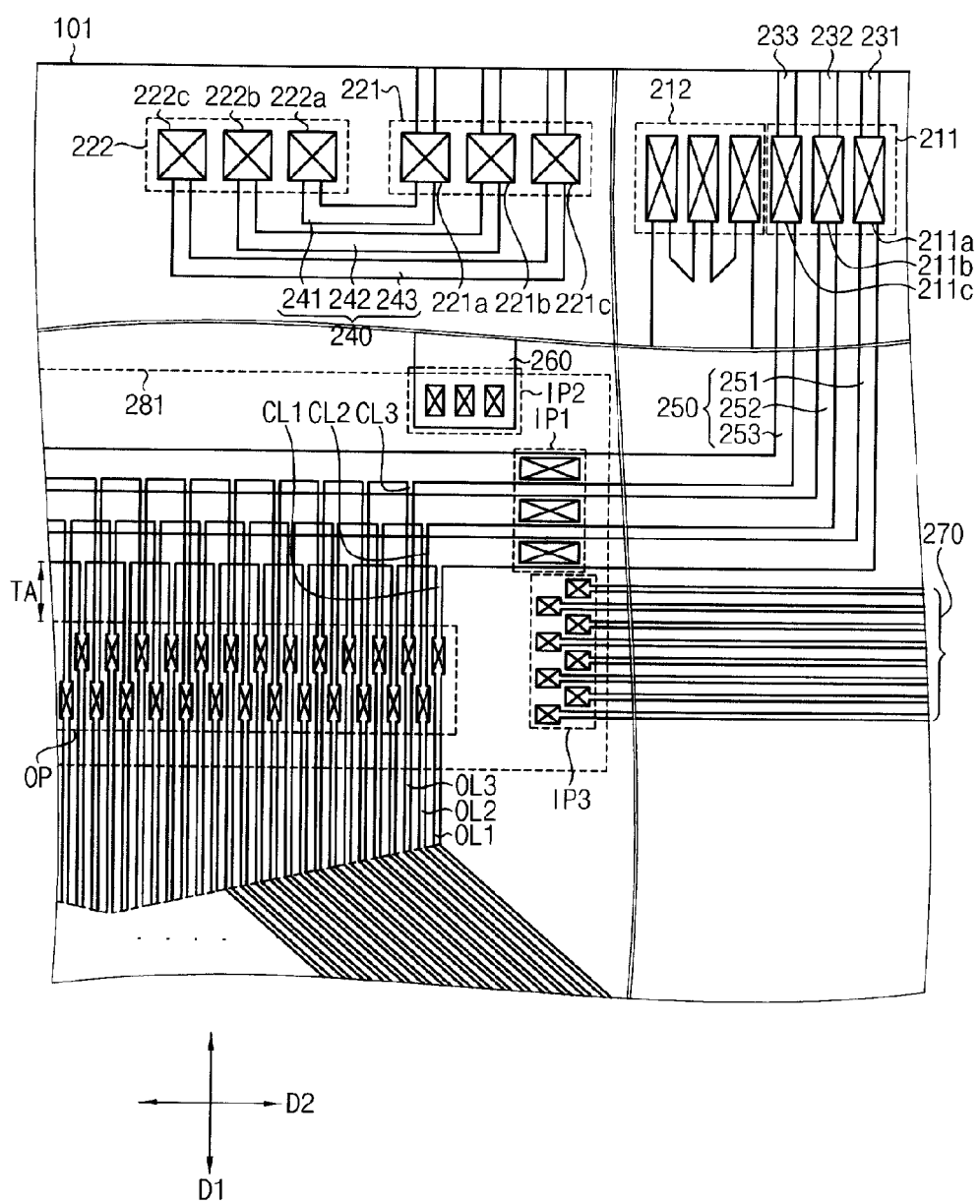
FIGS. 4A and 4B are plan views of a display substrate manufactured by the mother substrate of FIG. 1.
Figure 4B:
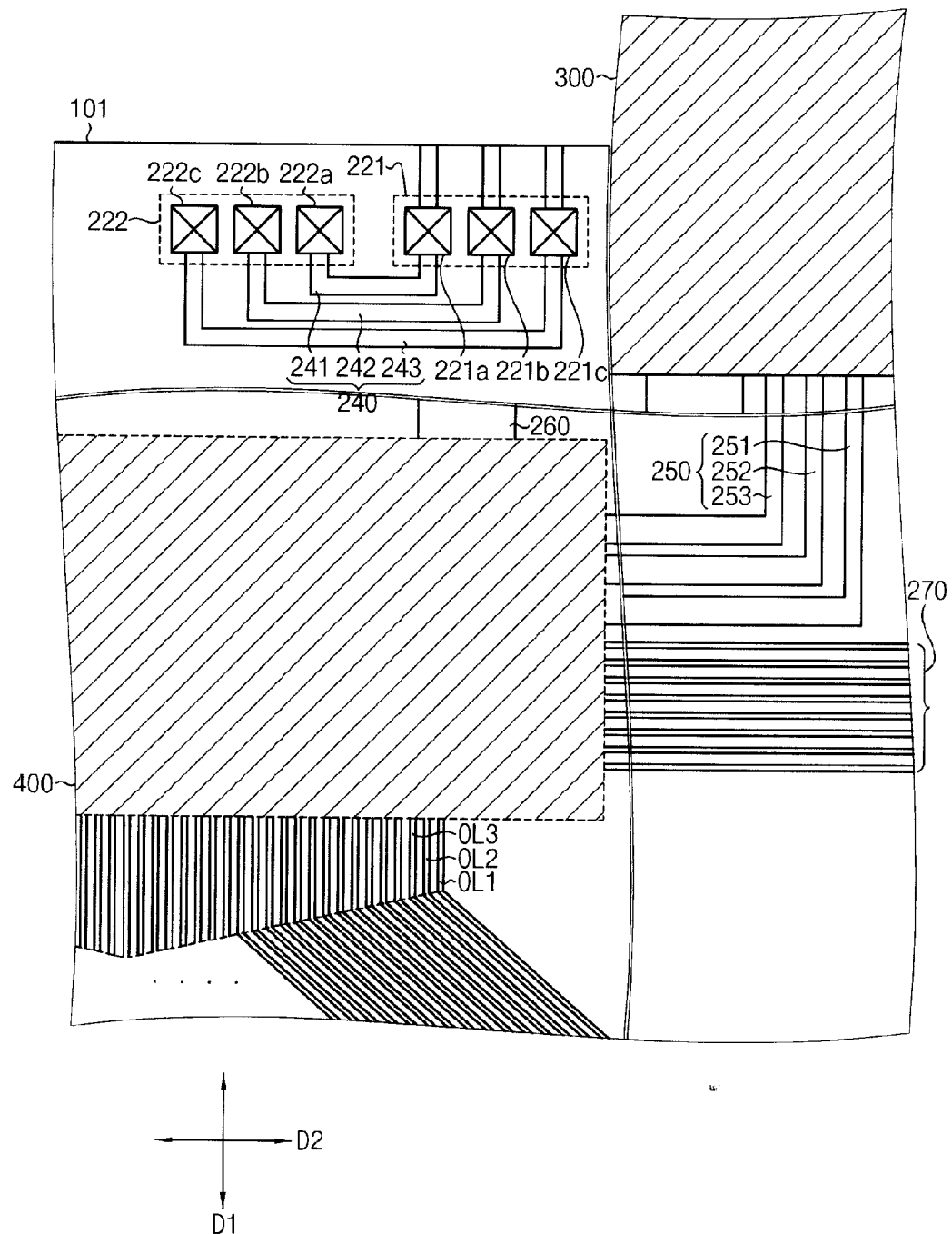

FIGS. 4A and 4B are plan views of the display substrate manufactured by the mother substrate of FIG. 1.

Referring to FIGS. 2, 4A and 4B, the display substrate 200 according to the exemplary embodiments of the present invention includes a first driving pad part 211, a first driving line part 250 and a first circuit mounted part 281.

The first driving pad part 211 is electrically connected to a terminal outputting a first drive signal. The first driving pad part 211 includes a first pad 211a, a second pads 211b and a third pad 211c.

First end portions of the first pad 211a, the second pad 211b and the third pad 211c are connected to the first inspection line 231, the second inspection line 232 and the third inspection line 233 extended toward corners of the display cell 200 cut along the cutting line 101. Second end portions of the first pad 211a, the second pad 211b and the third pad 211c are connected to the first driving line part 250.

The first driving line part 250 includes a first line 251, a second line 252 and a third line 253 that are connected to second end portions of the first pad 211a, the second pad 211b and the third pad 211c, respectively. The first line 251, the second line 252 and the third line 253 are penetrated through the first circuit mounted part 281 and the second circuit mounted part 282 to be extended along a second direction D2.

The first circuit mounted part 281 includes a trimming area TA for a laser trimming process when the cutting process is performed. The trimming area TA is defined between the first driving line part 250 and the output pad part OP. The first circuit mounted part 281 includes a first connection line CL1, a second connection line CL2, and a third connection line CL3 that are extended along the first direction D1. First end portions of the first connection line CL1, the second connection line CL2 and the third connection line CL3 are connected to the first line 251, the second line 252 and the third line 253, respectively. The first connection line CL1, the second connection line CL2 and the third connection line CL3 are extended to the trimming area TA, and second end portions of the first circuit mounted part 281 may be defined by the trimming area TA.

The display substrate 200 according to the exemplary embodiments of the present invention receives a first drive signal of the driving IC 400 through the first driving pad part 211. The first drive signal is delivered to the first driving line part 250. The driving IC 400 may receive the first drive signal through at least one first input pad part IP1 on the first driving line part 250 formed within the first circuit mounted part 281.

Inspection lines for an array inspection and a visual inspection are not formed on the first circuit mounted part 281 of the display substrate according to the exemplary embodiments of the present invention. Moreover, dummy pads for an array inspection and a visual inspection are not formed on the flexible pad part of the display substrate. Thus, since the size of the circuit mounted part is decreased, the size of the driving IC 400 may be decreased. In addition, because the size of the flexible pad part is decreased, the size of the flexible printed circuit board 300 may be decreased.

In FIG. 4, the other elements of the display device according to the present exemplary embodiments may be substantially the same as the elements described with reference to FIGS. 1 to 3, and thus any repetitive detailed explanation may hereinafter be omitted to avoid unnecessarily obscuring the present invention.

FIG. 5 is a plan view schematically illustrating a mother substrate according to exemplary embodiments of the present invention.

Hereinafter, the same reference numerals will be used to refer to the same or like parts as those described above, and any further explanation concerning the above elements will be omitted to avoid unnecessarily obscuring the present invention.

Referring to FIGS. 2 and 5, a mother substrate of the FIG. 5 further includes a first dummy pad DM1, a second dummy pad DM2, a third dummy pad DM3, a first shorting line SL1, a second shorting line SL2 and a third shorting line SL3 for an array inspection process and a V/I process in comparison with the mother substrate of the exemplary embodiments of the present invention.

The first dummy pad DM1, the second dummy pad DM2 and the third dummy pad DM3 are included in the flexible pad part 210. The first dummy pad DM1, the second dummy pad DM2 and the third dummy pad DM3 are connected to the first array pad 221a, the second dummy pad DM2 and the third array pad 221c through the first inspection line 231, the second inspection line 232 and the third inspection line 233, respectively.

The first shorting line SL1, the second shorting line SL2 and the third shorting line SL3 are respectively connected to the first dummy pad DM1, the second dummy ad DM2 and the third dummy pad DM3 to be penetrated through the first mounted part 281 and the second circuit mounted part 282 along a second direction D2.

The first shorting line SL1, the second shorting line SL2 and the third shorting line SL3 included in the first circuit mounted part 281 and the second circuit mounted part 282 are connected to an output pad part OP through the first connection line CL1, the second connection line CL2 and third connection line CL3 that are extended along a first direction D1.

Each of the first mounted part 281 and the second circuit mounted part 282 includes an area where a driving line part 250 is formed, an area where the first shorting line SL1, the second shorting line SL2 and the third shorting line SL3 are formed, and a trimming area TA defined between the output pad parts OP.

According to the FIG. 5, the mother substrate further includes dummy pads DM1, DM2 and DM1 and shorting lines SL1, SL2 and SL3 for the inspection process. Thus, the size of the flexible pad part 210 and the circuit mounted part may increase in comparison with those of the exemplary embodiments of the present invention.

Accordingly, an inspection process is performed by using a driving pad part receiving a drive signal and driving lines delivering the drive signal, so that the size of a FPCB and a driving IC may be decreased.

Figure 6:
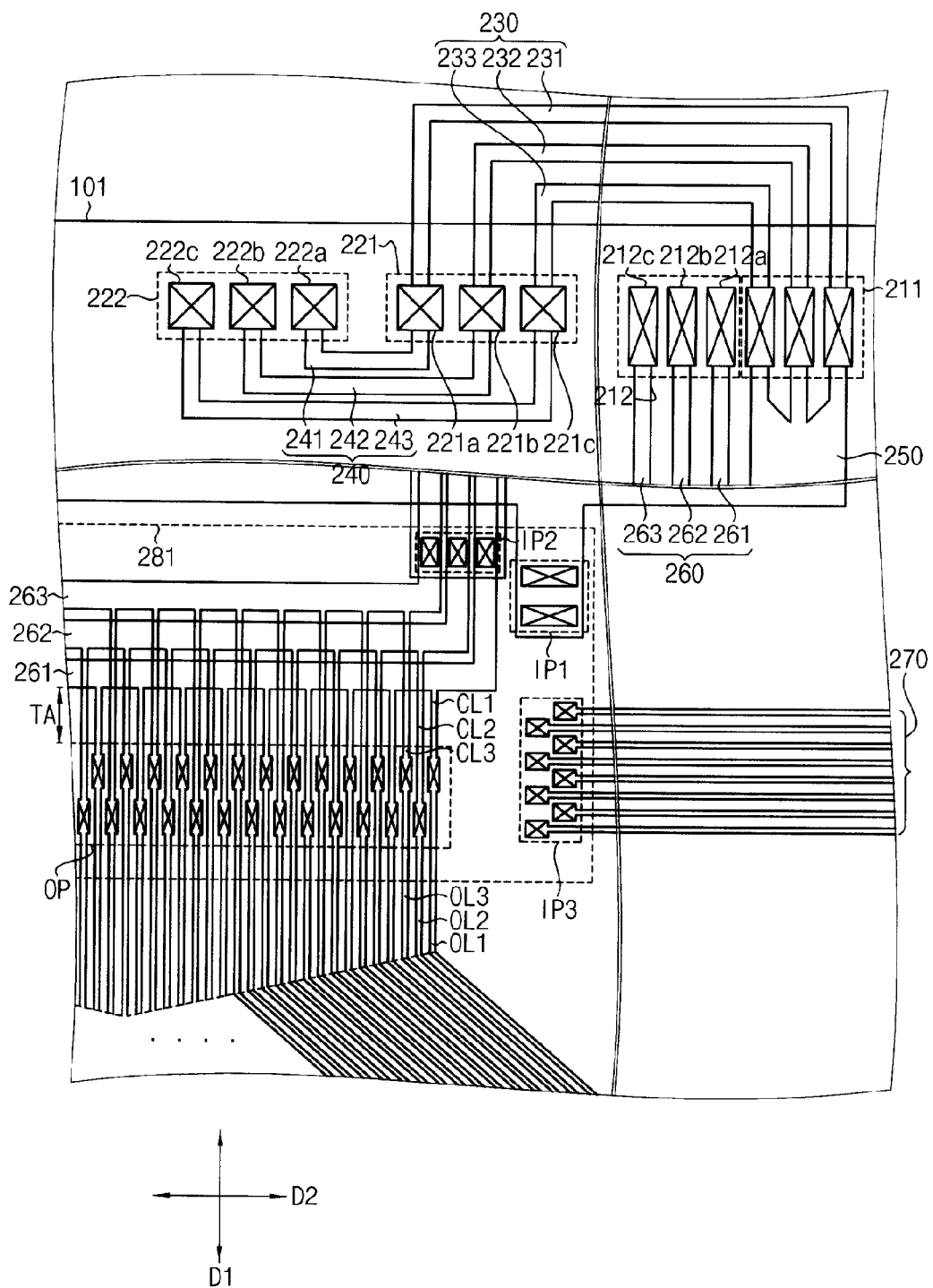
FIG. 6 is a plan view schematically illustrating a mother substrate including a display cell according to exemplary embodiments of the present invention.
Figure 7:
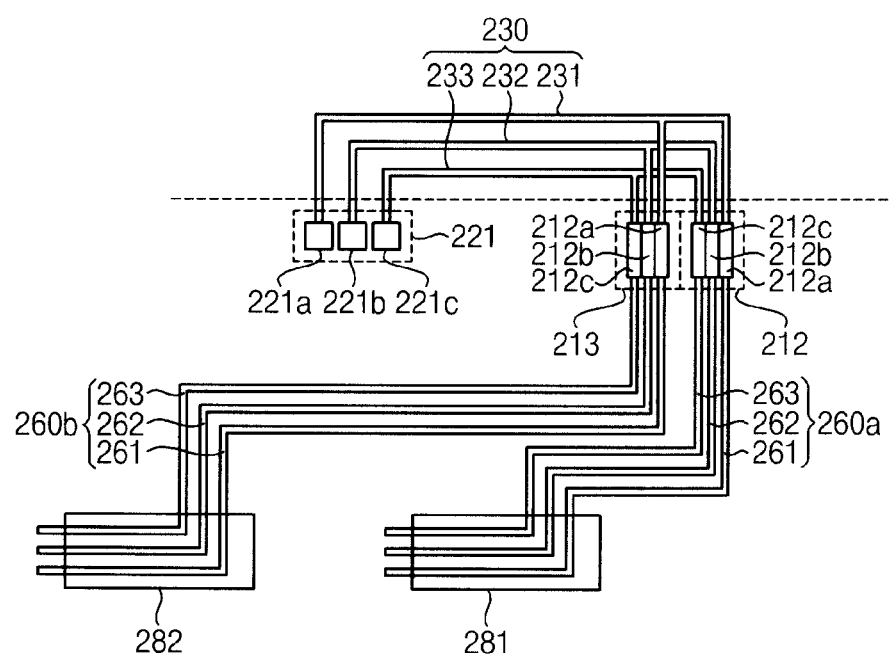
FIG. 7 is a diagram illustrating an inspection method through a second driving line part of FIG. 6.

FIG. 6 is a plan view schematically illustrating a mother substrate including a display cell according to exemplary embodiments of the present invention. FIG. 7 is a diagram illustrating an inspection method through a second driving line part of FIG. 6.

Referring to FIGS. 1, 6 and 7, the flexible pad part 210 includes a first driving pad part 211 receiving a first drive signal, second driving pad parts 212 and 213, and a third driving pad part (not shown) receiving a third drive signal.

The first drive signal is a signal transmitted to the first circuit mounted part 281, the second circuit mounted part 282, the third circuit mounted part 283 and the fourth circuit mounted part 284 in the multiple manner, and the second drive signal is a signal transmitted to the first circuit mounted part 281, the second circuit mounted part 282, the third circuit mounted part 283 and the fourth circuit mounted part 284 in the PTP manner. The third drive signal is a signal transmitted to the first circuit mounted part 281, the second circuit mounted part 282, the third circuit mounted part 283 and the fourth circuit mounted part 284 in a cascade manner.

The first driving pad part 211 is connected to the first driving line part 250.

The first driving line part 250 is disposed at external sides of the first circuit mounted part 281 and the second circuit mounted part 282 to be extended along the second direction D2. The first driving line part 250 may have a symmetric structure in a left and right direction.

Each of the second driving pad parts 212 and 213 is connected to a second driving line parts 260a and 260b. Each of the second driving pad parts 260a and 260b includes a first pad 212a, a second pad 212b and a third pad 212c. The second driving line parts 260a and 260b are connected to the first circuit mounted part 281 and the second circuit mounted part 282 in correspondence with a PTP manner that is a transmitting manner of the second drive signal. That is, a first line part 260a is connected to the first circuit mounted part 281, and a second line part 260b is connected to the second circuit mounted part 282.

According to the exemplary embodiments of the present invention, the array pad part 221 is commonly connected to the second driving pad parts 212 and 213. For example, a first inspection line part 230 includes a first inspection line 231, a second inspection line 232 and a third inspection line 233. The first inspection line 231, second inspection line 232 and the third inspection line 233 connect to the first array pad 221a, the second array pad 221b and the third array pad 221c and the first pad 212a, the second pad 212b and the third pad 212c of the second driving pad parts 212 and 213 through the cutting line 101.

The first line part 260a is extended along a second direction D2 to be penetrated through interiors of the first circuit mounted part 281. The second line part 260b is extended along the second direction D2 to be penetrated through interiors of the second circuit mounted part 282.

Each of the second driving line part 260a and 206b includes a first line 261, a second line 262 and a third line 263 that are respectively connected to the first pad 212a, the second pad 212b and the third pad 212c. For example, when the second driving line part 260a delivers a signal having a high voltage level of the second drive signals (e.g., an analog power signal AVDD), the second driving line part 260a may be divided into the first line 261, the second line 262 and the third line 263 in correspondence with the number of inspection signals. Alternatively, when the second driving line part 260a delivers a signal having a low voltage level of the second drive signals (e.g., a data signal), the second driving line part 260a may be used to deliver first data signal, second data signal and third data signal in correspondence with the number of inspection signals.

The first circuit mounted part 281 includes a first input pad part IP1, a second input pad part IP2, a third input pad part IP3 and an output pad part OP. The first input pad part IP1 is connected to the first driving line part 250 to receive the first drive signal, the second input pad part IP2 is connected to the second driving line part 260a to receive the second drive signal, and the third input pad part IP3 is connected to the third driving line part 270 to receive the third drive signal.

The first input pad part IP1 may include at least one input pad connected to the first driving line part 250 extended toward an exterior of the first circuit mounted part 281. The second input pad part IP2 may include at least one input pad disposed on the first line 251, the second line 252 and the third line 253 of the second driving line part 260a. The third input pad part IP3 may include at least one input pad connected to the third driving line part 270.

The output pad part OP includes a plurality of output pads. The output pads are connected to the first line 261, the second line 262 and the third line 263 that are extended along the second direction D2 through connection lines CL1, CL2 and CL3 that are extended along the first direction D1. For example, when a first data line, a second data line and a third data line are connected to a red pixel, a green pixel and a blue pixel, respectively, a first panout line OL1 connected to the first data line is the first line part 271 through the first connection line CL1, a second panout line OL2 connected to the second data line is the second line part 272 through the second connection line CL2, and a third panout line OL3 connected to the third data line is the third line part 273 through the third connection line CL3.

During the array inspection process and the V/I process are performed, a first inspection signal delivered through the first line part 261 may be applied to the red pixel, a second inspection signal delivered through the second line part 262 may be applied to the green pixel, and a third inspection signal delivered through the third line part 263 may be applied to the blue pixel.

Moreover, the first circuit mounted part 281 includes a trimming area TA defined between the output pad part OP and the second driving line part 260a. The trimming area TA is an area where the connection lines CL1, CL2 and CL3 are removed through a laser when the cutting process is performed. The output pad part OP and the second driving line part 260a may be electrically opened to each other after the cutting process is performed.

Although not shown in FIGS. 6 and 7, the second driving line part 260b penetrating an interior of the second circuit mounted part 281 has a shape substantially identical to the second driving line part 260a penetrating an interior of the first circuit mounted part 281.

Thus, after a cutting process and a bonding process for the display substrate according to the exemplary embodiments of the present invention are performed, the second driving pad parts 212 and 213 receive a second drive signal, and the second driving line parts 260a and 260b delivery the second drive signal to first and second driving ICs mounted on the first circuit mounted part 281 and the second circuit mounted part 282, respectively, in a PTP manner.

According to the exemplary embodiments of the present invention, an array inspection process and a visual inspection may be performed by using the second driving line parts 260a and 260b and the second driving pad parts 212 and 213. Thus, additional inspection lines may not be necessary from the circuit mounted part, so that the size of the circuit mounted part may be decreased. Consequently the size of the driving IC mounted on the circuit mounted part may also be decreased. Moreover, additional inspection pads may not be necessary from a flexible pad part, so that the size of the FPCB may be decreased. As a result, manufacturing costs of a display substrate may be reduced.

Figure 8:
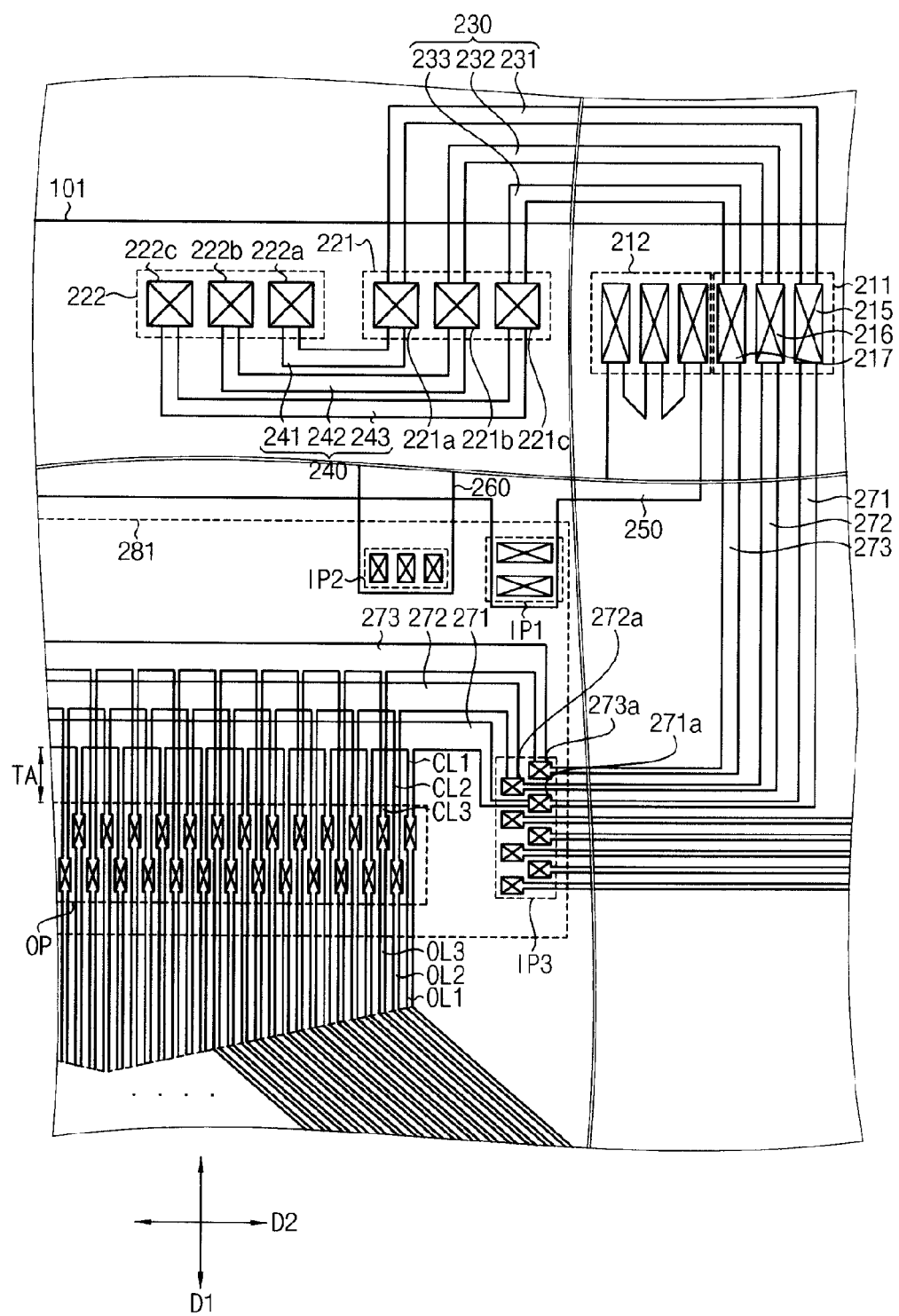
FIG. 8 is a plan view schematically illustrating a mother substrate including a display cell according to exemplary embodiments of the present invention.
Figure 9:
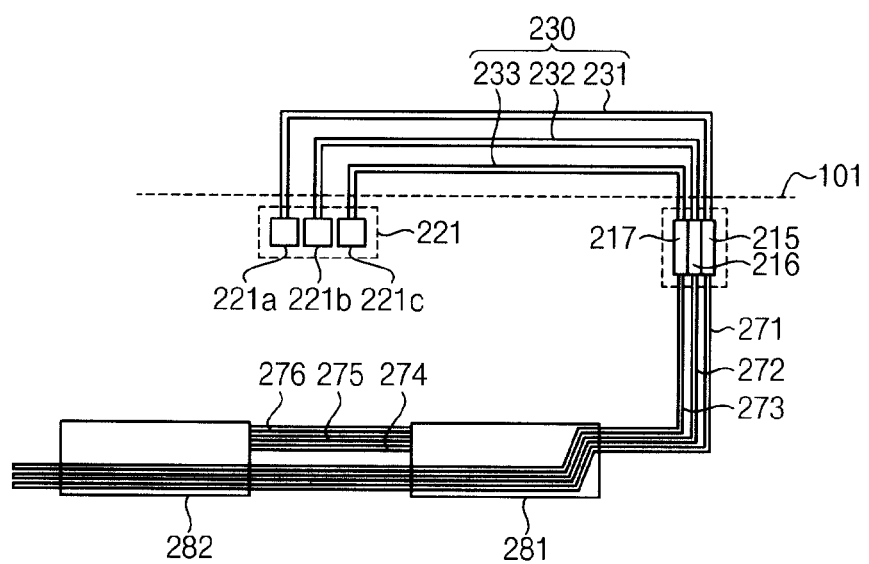
FIG. 9 is a t diagram illustrating an inspection method through a third driving line part of FIG. 7.

FIG. 8 is a plan view schematically illustrating a mother substrate including a display cell according to exemplary embodiments of the present invention. FIG. 9 is a diagram explaining an inspection method through a third driving line part of FIG. 7.

Referring to FIGS. 1, 8 and 9, the flexible pad part 210 includes a first driving pad part (not shown) receiving a first drive signal, a second driving pad part 212 receiving a second drive signal and third driving pad parts 215, 216 and 217 receiving a third drive signal.

The first drive signal is a signal transmitted to the first circuit mounted part 281, the second circuit mounted part 282, the third circuit mounted part 283 and the fourth circuit mounted part 284 in a multiple manner, and the second drive signal is a signal transmitted to the first circuit mounted part 281, the second circuit mounted part 282, the third circuit mounted part 283 and the fourth circuit mounted part 284 in a point-to-point (PTP) manner. The third drive signal is a signal transmitted to the first circuit mounted part 281, the second circuit mounted part 282, the third circuit mounted part 283 and the fourth circuit mounted part 284 in a cascade manner.

The first driving pad part 211 is connected to the first driving line part 250.

The first driving line part 250 according to the exemplary embodiments of the present invention may be disposed at an external portion of the first and second circuit mounted parts 281 and 282 to be extended along the second direction D2. The first driving pad part 211 and the first driving line part 250 may have a symmetric structure in a left and right direction.

The second driving pad part 212 is connected to the second driving line part 260. The second driving pad part 212 may have a symmetric structure in a left and right direction with respect to the second driving line part 260. The second driving line part 260 may be extended toward the first and second circuit mounted parts 281 and 282 in accordance with a transmitting manner of the second drive signal.

Each of the third driving pad parts 215, 216 and 217 is connected to third driving line parts 271, 272 and 273, respectively. A first pad part 215 is connected to a first line part 271, a second pad part 216 is connected to a second line part 272, and a third pad part 217 is connected to a third line part 273.

According to the exemplary embodiments of the present invention, the array pad part 221 is connected to the third driving pad parts 215, 216 and 217, respectively. For example, a first inspection line part 230 includes a first inspection line 231, a second inspection line 232 and a third inspection line 233. The first inspection line 231, the second inspection line 232 and the third inspection line 233 are connected to the first array pad 221a, the second array pad 221b and the third array pad 221c and the third driving pad parts 215, 216 and 217, respectively, via the cutting line 101.

Each of the third driving line parts 271, 272 and 273 is extended along a second direction D2 to be penetrated through interiors of the first circuit mounted part 281 and the second circuit mounted part 282. The third driving line parts 271, 272 and 273 are arranged in parallel with each other.

The first circuit mounted part 281 includes a first input pad part IP1, a second input pad part IP2, a third input pad part IP3 and an output pad part OP. The first input pad part IP1 is connected to the first driving line part 250 to receive the first drive signal, and the second input pad part IP2 is connected to the second driving line part 260 to receive the second drive signal. The third input pad part IP3 is connected to the third driving line part 270 to receive the third drive signal.

The output pad part OP includes a plurality of output pads. The output pads are connected to the first line 261, the second line 262 and the third line 263 that are extended along the second direction D2 through connection lines CL1, CL2 and CL3 that are extended along the first direction D1. For example, when a first data line, a second data line and a third data line are connected to a red pixel, a green pixel and a blue pixel, respectively, a first panout line OL1 connected to the first data line is the first line part 271 through the first connection line CL1, a second panout line OL2 connected to the second data line is the second line part 272 through the second connection line CL2, and a third panout line OL3 connected to the third data line is the third line part 273 through the third connection line CL3.

During the array inspection process and the V/I process are performed, a first inspection signal delivered through the first line part 271 may be applied to the red pixel, a second inspection signal delivered through the second line part 272 may be applied to the green pixel, and a third inspection signal delivered through the third line part 273 may be applied to the blue pixel.

Moreover, the first circuit mounted part 281 includes a trimming area TA defined between the output pad part OP and the third driving line parts 271, 272 and 273. The trimming area TA is an area where the connection lines CL1, CL2 and CL3 are removed through a laser when the cutting process is performed. The output pad part OP and the third driving lines 271, 272 and 273 may be electrically opened to each other after the cutting process is performed.

After a cutting process and a bonding process for the display substrate according to the exemplary embodiments of the present invention are performed, the third driving pad parts 215, 216 and 217 receive a third drive signal. The third drive signal is delivered to a first driving IC mounted on the first circuit mounted part 281 through the third driving line parts 271, 272 and 273. The third drive signal transmitting the first driving IC is delivered to a second driving IC mounted on the second circuit mounted part 282 through third driving lines 274, 275 and 276 formed between adjacent circuit mounted parts 281 and 282. As described above, the third drive signal is transmitted to the first driving IC and the second driving IC in a cascade manner. The third drive signal received to the third driving pad parts 215, 216 and 217 may be signals having the different levels.

According to the exemplary embodiments of the present invention, an array inspection process and a V/I process may be performed by using the third driving line parts 271, 272 and 273 and the third driving pad parts 215, 216 and 217. Thus, an additional inspection line may not be necessary from a circuit mounted part, so that a size of the circuit mounted part may be decreased. Consequently, a size of a driving IC mounted on the circuit mounted part may also be decreased. Moreover, an additional inspection pad may not be necessary from a flexible pad part, so that a size of a FPCB may be decreased. Furthermore, a size of the mother substrate including the display cell may be decreased. As a result, a manufacturing cost of a display substrate may be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display substrate, comprising:
at least one circuit mounted part comprising an input pad part coupled to an input terminal of a driving integrated circuit (IC) of the at least one circuit mounted part and an output pad part coupled to an output terminal of the driving IC;
a flexible pad part coupled to a terminal of a flexible printed circuit board, the flexible pad part comprising a driving pad part to receive a drive signal of the driving IC;
an array pad part directly connected to the flexible pad part by at least one first inspection line part formed crossing a cutting line, the cutting line defining a display cell corresponding to the display substrate;
a driving line part coupled to the driving pad part to be extended along a length direction of the at least one circuit mounted part; and
a plurality of connection lines extended toward the output pad part from the driving line part and being disposed within the at least one circuit mounted part,
wherein the at least one first inspection line part crosses the cutting line at least twice.

2. The display substrate of claim 1, wherein the driving pad part comprises a plurality of pads, and the driving line part comprises a plurality of lines connected to each of the pads, the lines being arranged parallel to each other.

3. The display substrate of claim 2, wherein the at least one circuit mounted part is arranged in the length direction, and the driving line part is coupled with the driving pad part and circuit mounted parts of the at least one circuit mounted part according to a one-to-plural ratio.

4. The display substrate of claim 3, wherein the drive signal comprises a logic power signal.

5. The display substrate of claim 2, wherein the at least one circuit mounted part is arranged in the length direction, and the driving line part is coupled with the driving pad part and circuit mounted parts of the circuit mounted part according to a one-to-one ratio.

6. The display substrate of claim 5, wherein the drive signal comprises at least one of a data signal, a clock signal, and an analog power signal.

7. The display substrate of claim 2, wherein the at least one circuit mounted part is arranged in the length direction, and the driving line part is coupled with the driving pad part and circuit mounted parts of the at least one circuit mounted part in a cascade manner.

8. The display substrate of claim 7, wherein the drive signal comprises at least one of a gamma signal and a carry signal.

9. The display substrate of claim 1, wherein a number of the at least one circuit mounted part is greater than a number of the flexible pad part.

10. A mother substrate, comprising:
a display cell defined by a cutting line, the display cell comprising:
at least one circuit mounted part comprising a driving integrated circuit (IC), an input pad part coupled to an input terminal of the driving IC, and an output pad part coupled to an output terminal of the driving IC;
a flexible pad part coupled to a terminal of a flexible printed circuit board, the flexible pad part comprising a driving pad part to receive a drive signal of the driving IC;
an array pad part directly connected to the flexible pad part by at least one first inspection line part formed crossing the cutting line;
a driving line part coupled to the driving pad part and extending along a length direction of the at least one circuit mounted part; and
a plurality of connection lines extended toward the output pad part from the driving line part and being disposed within the at least one circuit mounted part,
wherein the at least one first inspection line part crosses the cutting line at least twice.

11. The mother substrate of claim 10, wherein the array pad part is disposed adjacent to the flexible pad part within the display cell to receive an inspection signal when an array inspection is performed, and the at least one first inspection line part connects the array pad part and the driving pad part crossing the cutting line, and
wherein the mother substrate further comprises:
a visual inspection ("V/I") pad part disposed adjacent to the array pad part to receive an inspection signal when a visual inspection is performed; and
a second inspection line part connecting the V/I pad part and the array pad part.

12. The mother substrate of claim 10, further comprising:
a trimming area defined between the driving line part and the output pad part within the circuit mounted part, wherein at least a portion of the connection lines is removed when a trimming process is performed in the trimming area.

13. The mother substrate of claim 10, wherein the driving pad part comprises a plurality of pads corresponding to an inspection signal, and the driving line part comprises a plurality of lines connected to each of the pads and arranged in parallel.

14. The mother substrate of claim 10, wherein the at least one circuit mounted part is arranged in the length direction, and
the driving line part is coupled to the driving pad part and circuit mounted parts of the at least one circuit mounted part according to a one-to-plural ratio.

15. The mother substrate of claim 14, wherein the drive signal comprises a logic power signal.

16. The mother substrate of claim 10, wherein the at least one circuit mounted part is arranged in the length direction, and
the driving line part is coupled to the driving pad part and circuit mounted parts of the at least one circuit mounted part according to a one-to-one ratio.

17. The mother substrate of claim 16, wherein the drive signal comprises at least one of a data signal, a clock signal, and an analog power signal.

18. The mother substrate of claim 10, wherein the at least one circuit mounted part is arranged in the length direction, and
the driving line part is coupled to the driving pad part and the at least one circuit mounted part in a cascade manner.

19. The mother substrate of claim 18, wherein the drive signal comprises at least one of a gamma signal and a carry signal.

20. A method, comprising:
disposing a display cell defined by a cutting line;
mounting at least one circuit mounted part comprising a driving integrated circuit ("IC"), an input pad part coupled to an input terminal of the driving IC, and an output pad part coupled to an output terminal of the driving IC;
disposing a flexible pad part coupled to a terminal of a flexible printed circuit board, the flexible pad part comprising a driving pad part to receive a drive signal of the driving IC;
disposing at least one first inspection line part crossing the cutting line to directly connect an array pad part to the flexible pad part; and
disposing a driving line part coupled to the driving pad part to be extended along a length direction of the at least one circuit mounted part,
wherein a plurality of connection lines are extended toward the output pad part from the driving line part and are disposed within the at least one circuit mounted part,
wherein the driving line part is not electrically connected to the output pad part via the connection lines in response to removal of at least a portion of the connection lines, and
wherein the at least one first inspection line part crosses the cutting line at least twice.

21. The display substrate of claim 1, wherein:
the at least one first inspection line part comprises at least three first inspection lines, and
each first inspection lines crosses the cutting line at least twice.

\* \* \* \* \*